United States Patent [19]
Bond et al.

[11] 4,447,923
[45] May 15, 1984

[54] SETTING TOOL FOR WALL ANCHOR

[75] Inventors: Michael E. Bond, Topton; Harry E. Taylor, Wyomissing, both of Pa.

[73] Assignee: USM Corporation, Farmington, Conn.

[21] Appl. No.: 335,865

[22] Filed: Dec. 30, 1981

[51] Int. Cl.³ ............................................. B25B 15/00
[52] U.S. Cl. ..................................................... 7/165
[58] Field of Search .................. 7/138, 165; 81/90 C, 81/121 B, 436, 459; 72/114; 411/393, 370, 377, 396, 401; 248/58

[56] References Cited

U.S. PATENT DOCUMENTS

| 860,762 | 7/1907 | McGrady | 411/396 X |
|---|---|---|---|
| 3,144,261 | 8/1964 | Stephens | 411/401 X |
| 3,587,271 | 6/1971 | Rigot | 72/114 |
| 3,728,882 | 4/1973 | Rigot et al. | 72/114 |
| 3,785,598 | 1/1974 | Gillstrap | 248/58 |
| 4,285,225 | 8/1981 | Snell | 72/114 |

FOREIGN PATENT DOCUMENTS

| 127422 | 4/1948 | Australia | 411/401 |
| 771609 | 7/1934 | France | 411/396 |

*Primary Examiner*—James G. Smith
*Attorney, Agent, or Firm*—William F. White

[57] ABSTRACT

A tool is disclosed for setting a screw anchor within a wall. The tool includes a plastic handle attached to a threadable member for engaging the screw anchor. The plastic handle is contoured for easy grasping and has a hole at one end to facilitate rotation of the tool. The handle preferably has a recessed screwdriver blade at the opposite end for tightening a screw in the set screw anchor.

11 Claims, 7 Drawing Figures

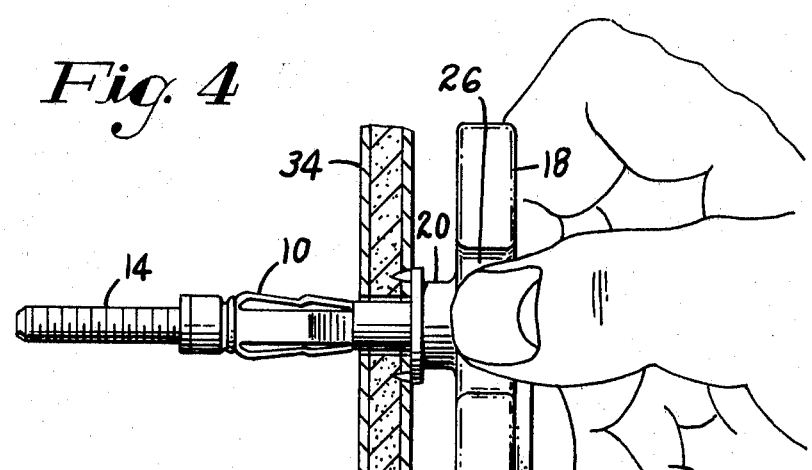
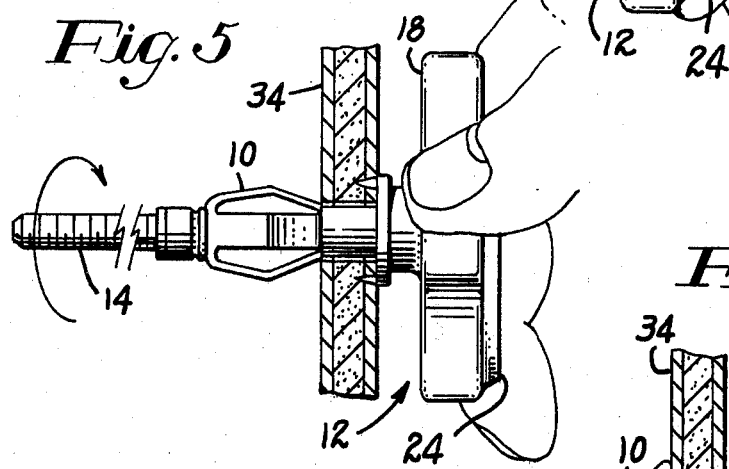
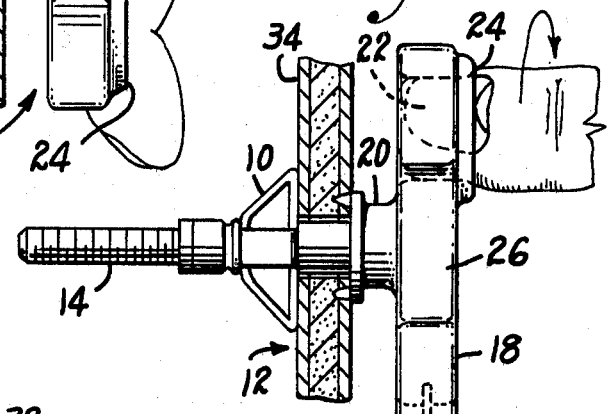
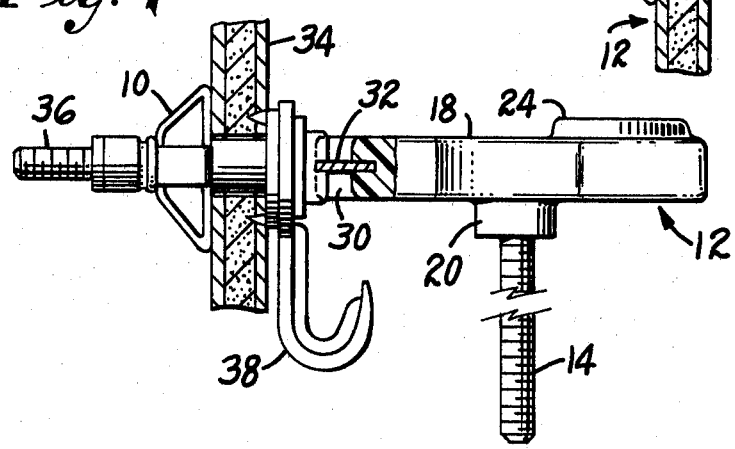

SETTING TOOL FOR WALL ANCHOR

FIELD OF THE INVENTION

This invention relates to the manner in which a screw anchor is secured to a wall. In particular, the invention relates to a tool for accomplishing the setting of the screw anchor to the wall.

BACKGROUND OF THE INVENTION

Screw anchors are well known for their ability to become anchored to a wall through the action of a screw being threaded into the anchor. The rotation of the screw causes the screw anchor to "break down" at some point behind the wall. This "breaking down" of the screw anchor has been heretofore accomplished by engaging a screwdriver with the screw normally supplied with the screw anchor. The screwdriver, however, often slips off the screw slot before the wall anchor is broken down. This can be attributed to the amount of torque necessary to initially break down the wall anchor structure.

Once the wall anchor has been broken down, the screwdriver must then be rotated a considerable number of additional turns in order to firmly secure the screw anchor to the backside of the wall. This often consumes a considerable amount of time before the screw anchor is firmly set by the screwdriver.

It has heretofore been known to use a dedicated tool to set the screw anchor. These dedicated tools have usually addressed the problem of initially breaking down the screw anchor through the application of an appropriate amount of torque. The design of these tools for applying an appropriate breakdown torque has, however, resulted in tools that are not easily turned in a continuous manner following the initial breaking down of the screw anchor. These tools have furthermore often allowed for the application of a considerably greater torque than is required for the final setting of the screw anchor. This has led to an overset of the screw anchor causing the deformed screw anchor to structurally degrade the wall.

OBJECTS OF THE INVENTION

It is an object of this invention to provide a new and improved setting tool for a screw anchor.

It is another object of this invention to provide a setting tool which allows for the screw anchor to be easily broken down.

It is still another object of this invention to provide a torque limiting setting tool which eliminates the application of excessive torque to the screw anchor during the final setting of the screw anchor.

It is a still further object of this invention to provide a setting tool having the capability for ultimately installing the screw within the screw anchor.

SUMMARY OF THE INVENTION

The above and other objects are achieved according to the present invention by a setting tool of particular construction. The setting tool comprises a threadable stem joined to a plastic handle. The plastic handle is shaped in such a manner as to allow an appropriate torque to be transmitted to the threadable stem for the purpose of initially breaking down the screw anchor. The plastic handle, moreover, has a spaced hole from the stem which accommodates a human finger. An inserted finger can quickly rotate the setting tool and hence set the screw anchor. The torque which is thus applied to the screw anchor is limited by the finger force which can be applied at the spaced distance from the stem. This limited torque sufficiently deforms the screw anchor so as to provide a firm anchoring base to a wall structure. The screw anchor tool, furthermore, has a built-in screw driver blade which can be used to rotate and set the screw that is ultimately inserted into the screw anchor.

DESCRIPTION OF THE DRAWINGS

The above and other features of the invention will now be particularly described with reference to the accompanying drawings, in which:

FIG. 4 through 7 illustrate the use of the setting tool with respect to a screw anchor inserted within a wall.

DESCRIPTION OF THE PREFERRED EMBODIMENT

Figure 1:
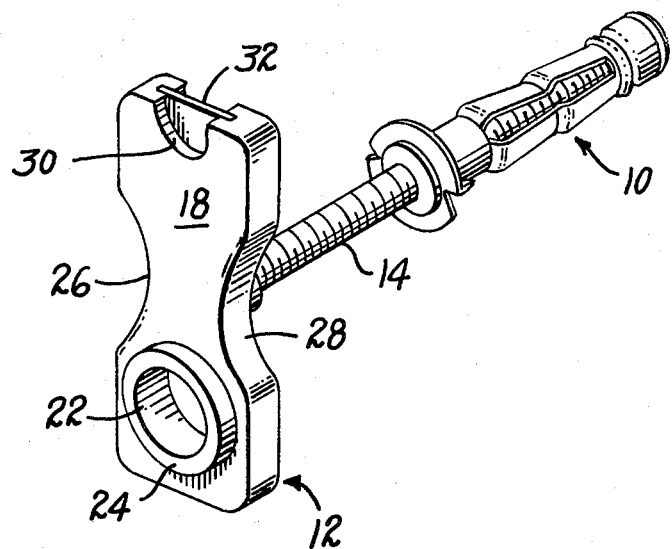
FIG. 1 is an overall perspective view of the setting tool threadably engaging a screw anchor.
Figure 3:
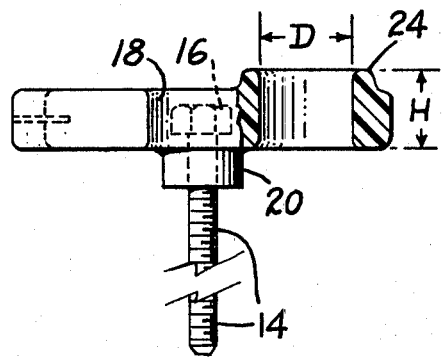
FIG. 3 is a partially cross-sectioned elevational view of the setting tool.

Referring to FIG. 1, a screw anchor 10 is seen to be threadably engaged by a setting tool 12. In particular, a threaded stem 14 of the setting tool is seen to extend completely through the screw anchor 10 so as to threadably engage each end. It is to be appreciated that the threaded stem 14 will differ in size depending on the size of the screw anchor 10. The full length of the threadable stem 14 is illustrated in FIG. 3. The threadable stem 14 is seen to be part of a bolt 16 having a head which is encapsulated within a handle 18. The handle 18 is preferably a plastic handle formed in a mold which accommodates the bolt 16. The molded handle 18 is seen to include a neck 20 which reinforces the encapsulation of the bolt 16 for a preferred distance of $\frac{1}{4}$ inch (0.64 centimeters) along the bolt.

Figure 2:
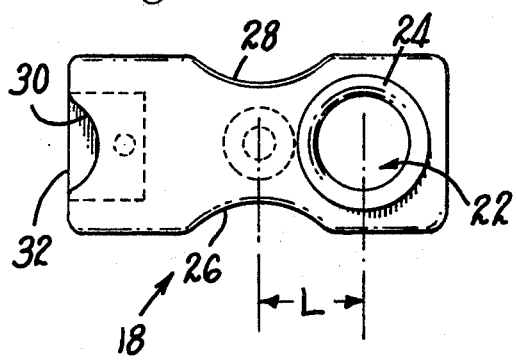
FIG. 2 is a plan view of the setting tool.

Referring to FIGS. 1 and 2, it is seen that the handle 18 has a circular hole 22 formed therein at a distance "L" from the center of the stem 14. The distance L is preferably 11/16 of an inch (1.75 centimeters). A raised rim 24 defines a suitable diameter and depth for the hole 22 so as to comfortably accommodate the index finger of a normal sized human hand. In this regard, the diameter "D" of the hole 22 is preferably $\frac{5}{8}$ of an inch (1.59 centimeters) whereas the depth "H" is preferably $\frac{1}{2}$ inch (1.27 centimeters). As will become apparent hereinafter, the ability of the hole 22 to accommodate an index finger facilitates a relatively easy rotation of the tool 12. The spaced hole also provides a torque limiting feature during the latter stages of firmly anchoring the screw anchor 10. This will be further discussed hereinafter.

The handle 18 is seen to have a pair of contoured curvatures 26 and 28 which define a reduced middle portion. The radius of curvature for each of the contoured curvatures 26 and 28 is preferably $\frac{3}{4}$ inch (1.91 centimeters). This radius defines an inner contour which accommodates a lengthwise portion of a normal size human thumb. As will become apparent hereinafter this allows for a firm grasping of the handle 18 so as to allow an appropriate breakdown torque to be applied to a screw anchor.

The handle 18 is also seen to include a recess 30 located at the end of the handle 18 opposite the hole 22. The recess 30 accommodates a screw driver blade 32 which is flush with the edge contour of the handle 18. The screw driver blade 32 is preferably located within the mold for the plastic handle 18 so as to be encapsulated therein in much the same manner as has been previously discussed for the bolt 16.

Referring now to FIG. 4, the setting tool 12 is seen to be threaded into the screw anchor 10 within a wall 34. The handle 18 is firmly grasped by a hand as shown. The thumb of the hand rests within the contoured curvature 26 whereas the index finger is aligned along the opposite side of the handle 18 so as to allow for a firm application of torque. The neck 20 of the tool 18 is flush against the face of the screw anchor 10. At this point, the application of a torque so as to further rotate the setting tool 12 will cause the screw anchor 10 to break down as illustrated in FIG. 5. Immediately following the application of the breakdown torque in FIG. 5, the setting tool will become noticeably easier to rotate. This allows the setting tool to be rotated in the manner illustrated in FIG. 6. Specifically, the index finger of the operator's hand is inserted into the hole 22 of the handle 18. The index finger is thereafter rotated in complete circles so as to continuously rotate the setting tool. As the handle is thus rotated, the smooth interior wall surface of the hole 22 provides a relatively friction free contact with the index finger. This allows for the interior wall of the hole to rotate with respect to the inserted index finger. It is to be appreciated that the threaded stem 14 will quickly draw the collapsed screw anchor 10 tight against the wall 34 as is shown in FIG. 6. At this time, the screw anchor 10 will again tend to resist further deformation which can be easily sensed by the inserted index finger attempting to rotate the handle 18. This provides a clear indication to one using the setting tool that the screw anchor has been appropriately set and that no additional rotation need occur. The setting tool is now disengaged from the screw anchor 10 by merely reversing the rotation of the handle 18. This is again rapidly accomplished by virtue of the continuous engagement of the index finger in the hole 22 of the handle 18 as the latter is rotated in the reverse direction.

Referring to FIG. 7, the screw anchor 10 is illustrated with a screw 36 having been threaded therein. The screw 36, moreover, has been inserted through a wall hook 38 in a known manner. The handle 18 of the setting tool 12 is partially broken away in FIG. 7 so as to illustrate the engagement of the screwdriver blade 32 with the screw head slot of the screw 36. The recessed nature of the screwdriver blade 32 guards against slippage from the screw head slot as the screw 36 is tightened against the wall hook 38. It is furthermore to be noted that the threadable stem 14 provides a torque lever for the final tightening of the screw 36. In other words, the handle 18 of the setting tool is conveniently grasped in such a manner as to allow thumb contact with the threaded stem 14. The application of force at the thumb point of contact creates a leveraged force resulting in a tightening torque being applied to the screw 36.

From the foregoing, it is to be appreciated that a preferred embodiment has been disclosed for a tool which both sets a screw anchor and thereafter facilitates the tightening of a screw within the thus set screw anchor. It should be understood that other structures and embodiments providing the same of similar functions may be utilized without departing from the scope of the present invention.

What is claimed is:

1. A tool for setting a screw anchor, within a wall, said tool comprising:
    means for threadably engaging the screw anchor; and
    means for manually applying separate and distinct torque levels to said threadably engaging means, said torque applying means comprising;
    a first means for manually applying a breakdown torque to said threadably engaging means; and
    a second means for manually applying a continuous lower level torque to said threadably engaging means following the breakdown of the screw anchor, the lower level torque being substantially less than the break-down torque and occurring in a continuous manner until the screw anchor has been set against the wall.

2. The tool of claim 1 further comprising:
    means for drivably engaging the slot of a screw inserted into the screw anchor following the setting of the screw by said second means.

3. The tool of claim 1 wherein said second means for manually applying a lower level torque comprises:
    a lever having a portion extending outwardly from said threadably engaging means, said lever having a hole spaced from said threadably engaging means, for receiving an index finger which applies an appropriate force to the interior of said hole so as to rotate the threadably engaging means as the finger is rotated.

4. The tool of claim 3 wherein said lever has a second portion extending in the opposite direction from said lever portion having the hole for receiving the index finger, said second portion terminating in an end having means for engaging the slot of a screw inserted into the screw anchor following the setting of the screw by said second means.

5. A tool for setting a screw anchor within a wall, said tool comprising:
    a threadable stem for threadably engaging the screw anchor; and
    a plastic handle having a middle portion permanently affixed to an end of said threadable stem, said plastic handle furthermore having end portions extending to either side of said middle portion, the first end portion having a hole for receiving an index finger, said hole being spaced from said threadable stem so as to allow for rotation of the stem when the finger is inserted into said hole and rotated.

6. The tool of claim 5 wherein said middle portion is inwardly contoured relative to the end portions so as to facilitate a grasping of the handle during initial rotation of the threadable stem so as to break down the screw anchor.

7. The tool of claim 5 wherein said threadable stem is a bolt having a head completely encapsulated within said plastic handle, said plastic handle having a neck portion extending downwardly from the encapsulated bolt head.

8. The tool of claim 5 wherein the interior wall of the hole in said first end portion is smoothly molded so as to allow for slippage between the smooth wall and an inserted index finger as the finger is rotated.

9. The tool of claim 8 wherein said plastic handle has a second end portion extending from said middle portion in a direction opposite to said first end portion, said second end portion having a screwdriver blade for engaging a slot in a screw that has been inserted into a previously set screw anchor.

10. The tool of claim 9 wherein said second end portion was a recess which surrounds said screwdriver blade so as to guard against slippage during final tightening of the screw within the previously set screw anchor.

11. The tool of claim 5 wherein said hole extends through the plastic handle in a direction substantially parallel to said threadable stem.

* * * * *